United States Patent

Brown

[15] 3,693,247
[45] Sept. 26, 1972

[54] METHOD OF SECURING TOGETHER A PLURALITY OF STRUCTURAL MEMBERS

[72] Inventor: Clarence K. Brown, 6219 East 6th St., Long Beach, Calif. 90814

[22] Filed: Feb. 2, 1970

[21] Appl. No.: 7,617

Related U.S. Application Data

[63] Continuation-in-part of Ser. No. 764,811, Oct. 3, 1968, abandoned.

[52] U.S. Cl. ..................29/512, 29/523, 29/525, 85/77, 287/189.36 F
[51] Int. Cl. ..................B21d 39/00, B23p 11/00
[58] Field of Search..............29/512, 522, 523, 525; 287/189.36 F; 85/77

[56] References Cited

UNITED STATES PATENTS

| | | | |
|---|---|---|---|
| 2,321,170 | 6/1943 | Wallace | 85/77 |
| 3,270,410 | 9/1966 | Salter et al | 287/189.36 F X |
| 3,271,058 | 9/1966 | Anderson | 287/189.36 F |
| 3,461,771 | 8/1969 | Briles | 287/189.36 F |
| 3,493,254 | 2/1970 | Summnerlin et al | 287/189.36 F |

*Primary Examiner*—Charlie T. Moon
*Attorney*—Jessup & Beecher

[57] ABSTRACT

The invention is concerned with fasteners which are used to secure a plurality of plates, or other structural members, together in an interference fit between the fastener and the plates to impart a residual hoop stress within the structural members and around the hole through which the fastener extends so as to obviate fatigue failure in the structural members in the vicinity of the hole. The fastener assembly of the invention comprises the combination of a flared sleeve of relatively soft material, and a tapered mandrel of relatively hard material. The mandrel is first driven into the sleeve at the factory in a preliminary interference fit with the sleeve, and the sleeve is then finish ground to the final tolerances, so that each mandrel and sleeve becomes a matched pair. When inserted into the hole in the structural members to be joined thereby, the mandrel is then driven further into the sleeve causing the sleeve to expand radially outwardly to assume a final diameter greater than the original diameter of the hole. In this way the fastener assembly imparts a residual tension stress into the portions of the structural members surrounding the hole; this being achieved without burnishing or galling the bore of the hole due to the fact that the expansion of the sleeve is purely in the radial direction and there is no axial movement thereof.

2 Claims, 6 Drawing Figures

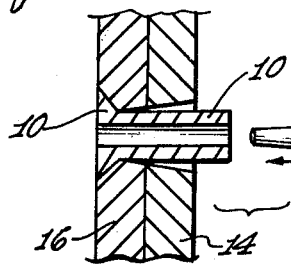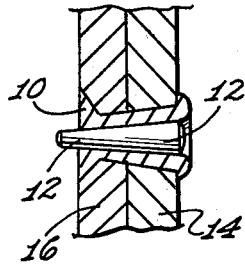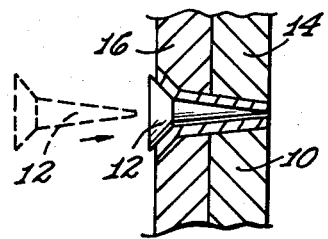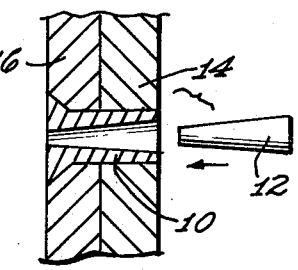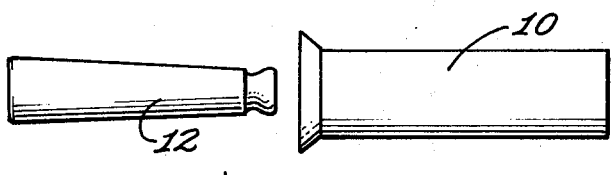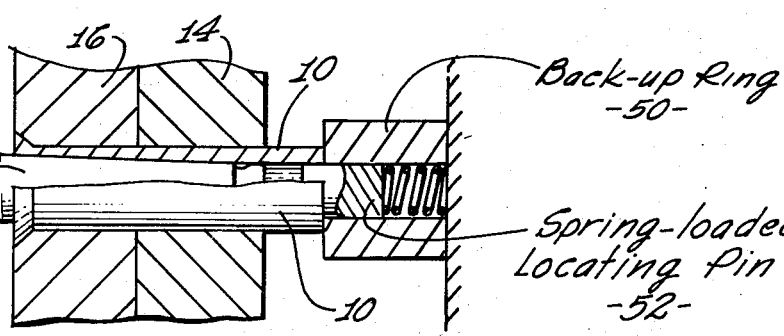

METHOD OF SECURING TOGETHER A PLURALITY OF STRUCTURAL MEMBERS

This application is a continuation-in-part of Copending Application Ser. No. 764,811 which was filed Oct. 3, 1968, now abandoned.

BACKGROUND OF THE INVENTION

The fastener assembly of the invention finds particular utility as an aircraft structural fastener. However, it will become evident as the description proceeds that the fastener assembly is not limited to such a use, but has general utility wherever structural fasteners are required. The fastener assembly of the invention exhibits the desired characteristic of low bearing deformation which is a function of the malleability of the fastener material. This characteristic is achieved by the composite fastener of the invention since it has a limited amount of highly malleable material in the form of the sleeve, and a major amount of less malleable material in the mandrel.

The net result of the fastener assembly of the invention is the provision of a composite fastener of low bearing deformation. Specifically, in the case of the composite fastener of the invention, there is a limited amount of malleable material adjacent the bore of the hole which receives the fastener. However, the greater portion of the fastener consists of the harder material of the mandrel so as to produce an aggregate fastener of low bearing deformation. The resulting composite fastener of the invention, therefore, has a relatively high yield point, while still conforming at its outer surface closely to fit the hole in the structural members joined thereby, and to introduce the aforesaid interference fit between the fastener and the members.

A further advantage in the use of the composite fastener of the invention is that appropriate selection may be made of the sleeve and mandrel material so as to protect the structure in which the fastener is used against the galvanic corrosion due to contact of dissimilar metals. When the fasteners are used in aircraft, for example, the typical structural materials are aluminum or aluminum alloy. The sleeve of the composite fastener of the invention may then be made of a compatible metal so that there will be virtually no dissimilar metals corrosion between the fastener and the structural materials. Should corrosion occur between the sleeve of the composite fastener and its mandrel, replacements may be made without deterioration of the structure itself.

The concept of the present invention permits, as will be described, a sleeve to be used which has the configuration of a tubular flared rivet, composed, for example, of a relatively soft metal such as aluminum. The concept of the invention also provides an improved means in the form, for example, of a tapered mandrel of relatively hard material for radially stressing the tubular rivet and causing it to flow and fill the hole in the joined structural members. Even though the tolerances are not held closely, and even though the tapering of the hole is not uniform. The tapered mandrel, as will be described, firmly retains the hollow sleeve rivet in the hole in the joined structural members by upsetting the end of the hollow rivet remote from its head.

The resulting fastener assembly provides a high shear strength, and it introduces a controlled residual tension stress into the portions of the joined structural members around the hole. This residual tension stress reduces the cyclic stress in the joined members when they are subjected to intermittent tension. This, in turn, reduces the notch effect and the hole effect, and it also reduces the susceptibility of the material of the joined structural members to exhibit fatigue cracks originating at the hole therein. As mentioned above, this residual tension stress is achieved by the fastener of the invention without any concomitant galling or burnishing effect in the bore of the hole which, in the prior art assemblies, has been found to reduce considerably the immunity of the joined structural members to the aforesaid notch and fatigue effects.

The composite fastener of the invention also has a feature in that it may be easily installed by automatic equipment of any appropriate known type. Such equipment, for example, is capable of holding the structural plates to be joined together, of drilling the holes in the plates, of inserting the composite fastener, and of driving the mandrel of the fastener into its installed position.

It may be stated, therefore, that a primary objective of the present invention is to provide a composite fastener which is capable of introducing into the joined structural material a controlled residual tension, without any burnishing or galling effects, which will prolong the fatigue life of the joined material long beyond that achieved by any of the prior art fasteners. The composite fastener of the invention provides a controlled amount of stored energy and associated residual tension stress in the joined material when installed in holes drilled to normal tolerances, so that installation of the composite fastener is simple and straightforward.

BRIEF DESCRIPTION OF THE DRAWINGS

FIG. 1 shows one form of the composite fastener assembly of the invention which, in the illustration, includes a sleeve having a flush-type head, and a mandrel which is inserted into the sleeve;

FIG. 2 shows the assembly of FIG. 1, with the mandrel in place, and with the sleeve deformed so as to hold the joined structural members firmly together;

FIGS. 3 and 4 show various different configurations and embodiments of the composite mandrel and sleeve combination of the invention;

FIG. 5 represents the various pre-assembly steps which are carried out at the factory, and by which the mandrel and sleeve of the composite fastener of the invention are preliminarily joined together, prior to the final finish grinding operation on the sleeve; and FIG. 6 shows the manner in which the composite fastener of FIG. 5 is driven into place into a hole in structural plates to be joined thereby.

DETAILED DESCRIPTION OF THE ILLUSTRATED EMBODIMENTS

The composite fastener shown in FIGS. 1 and 2 is composed of two components, including a sleeve 10 of relatively soft material and a mandrel 12 of relatively hard material. The fastener is shown as joining together two structural sheets or plates 14 and 16 of material. The plates 14 and 16 are first prepared, for example, by drilling a cylindrical hole through the two plates, and by then reaming a tapered hole from the right side in FIG. 1, and counter-sinking the front or left face of the plate 16. The counter-sink is designed to match the flush head of the illustrated sleeve 10. This head is designed to provide the required tension capabilities of the fastener assembly.

For a shear transfer fastener, for example, the tension required is relatively small, so that the flush head of the sleeve 10 can, likewise, be relatively small. Although the assembly is shown with a sleeve 10 having a flush-type head, it will be understood that a protruding type of head may also be used. Also, although the sleeves shown and described in the embodiments herein are of the pin type so as to be equivalent to the prior art tubular rivets in their general configuration, bolt-type sleeves threaded at one end may also be used, when a particular application establishes a preferred use for the bolt-type of sleeve.

The tapered ream on the back face of the structural plate 14 and which extends through the plate 14 partly into the plate 16 is designed to match the radially expanded sleeve 10, after the mandrel 12 has been driven into the sleeve, as shown in FIG. 2. The tapered ream preferably has a slightly smaller taper than the taper of the mandrel so as to adjust for loss in sleeve thickness caused by sleeve expansion. Such a loss is obviously greater at the back end of the sleeve than the front end. As mentioned above, the sleeve 10 is made of relatively soft material so that it will flow against the bores of the holes through the structural plates 14 and 16. This provides a tight fit between the sleeve and the plates on one hand, and between the sleeve and the mandrel 12 on the other hand, so that the fastener is tightly held within the plates 14 and 16. Also, the radial expansion of the sleeve is such that its final diameter is greater than the original diameter of the holes in the plates so that the desired interference fit between the fastener and the plates is achieved. Also, this interference fit is produced by purely radial expansion of the sleeve and galling or burnishing of the bores is obviated.

The composite fastener of FIGS. 1 and 2 is installed after the hole has been prepared in the manner described above, first by clamping the joined structural plates 14 and 16 together, and then by inserting the sleeve 10 and holding it firmly against the front face of the plate 16. The tapered mandrel 12 may then be inserted into the sleeve, and forced towards the front face until the sleeve interferes with the hole and the mandrel is flush with the head of the sleeve. Then a butt is upset on the sleeve 10 to provide the required tension capability in the fastener for shear transfer. This butt also holds the mandrel firmly in place and holds the sleeve firmly in place in the plates 14 and 16. As will be described in some detail subsequently, and as mentioned above, the mandrel and sleeve may be preliminary joined at the factory by partially inserting the mandrel into an interference press fit with the sleeve, and by then finishing the external sleeve surface by grinding it to the desired tolerances.

When the mandrel 12 is being inserted to its final position of FIG. 2, the sleeve is being expanded radially. There will be a relatively small force required to insert the mandrel until the sleeve completely coacts with the bores of the hole in the joined plates 14 and 16. The force required to move the mandrel then increases materially, since the mandrel is now expanding the radius of the hole in the joined plates to insert a residual tension or hoop stress in the area of the joined plates around the hole. By controlling this force, a controlled amount of such residual interference tension can be introduced into the joined plates 14 and 16 for optimum fatigue immunity and immunity from notch effects.

The aforesaid upsetting of the sleeve at the end thereof remote from its head, so as to form a butt, provides a simple retention system for the assembly. That is, the sleeve 10 is retained in the holes in the joined plates 14 and 16 by the reverse tapers provided in the hole preparation. The mandrel 12 is retained in the sleeve 10 by the interference fit of a self-locking taper. This is a phenomenon which is well understood in the mechanical engineering art, and which exists when matched cones of less than approximately 14° are engaged. Thus, the upsetting of the end of the sleeve remote from its head in the embodiment of FIGS. 1 and 2 forms a redundant retaining means for the mandrel.

It will be appreciated, therefore, that the composite fastener assembly described in conjunction with FIGS. 1 and 2 comprises a combination of a sleeve 10 of relatively soft material, together with a tapered mandrel 12 of relatively hard material. The mandrel, as described, is driven into the sleeve and it causes the sleeve to flow and adapt itself to the walls of the holes through the joined members. As also mentioned, the sleeve may be considered similar to a tubular rivet or bolt which is tapered internally and which is cylindrical externally. When installed, the tapered mandrel 12 causes the sleeve to expand radially within the hole in the joined structure and then causes the sleeve and the joined material to expand radially to a prescribed diameter, so that a desired and controlled amount of residual tension may be introduced into the joined material.

The mandrel taper angle is preferably relatively shallow, and is chosen as a compromise between two influence parameters. It is desirable to have the mandrel taper shallow to minimize the amount of sleeve material in the assembly, and it is also desirable to have the mandrel taper relatively steep to minimize the mandrel travel required to achieve a desired radial expansion of the sleeve. The taper angle of the mandrel should be chosen to satisfy both criteria. As mentioned above, the selected taper angle is such that the mandrel is self-locking within the sleeve, that is, the taper is considerably less than 14°. Then, the butt end of the sleeve 10 provides a redundant lock for the mandrel. It should also be noted that the sleeve 10 can be tailored to a particular application so as to obtain special effects. For example, higher bearing pressures and consequently higher residual tension stresses may be obtained in particular areas by appropriately shaping the outside diameter of the sleeve.

As mentioned above, various materials may be used for the sleeve and the mandrel. For example, the following sleeve materials may be used: 2017T4 aluminum alloy, 7075T73 aluminum alloy, 300 Series corrosion resistant steel alloys, A—286 corrosion resistant steel, B120VCA titanium alloy, Beta 111 titanium alloy. Also, the following materials may be used for the mandrel: 7075T6 aluminum alloy, 160—180 KSI heat treat range alloy steels, 220 KSI and above heat treat range alloy steels, A—286 corrosion resistant steel, 6AL—4V titanium alloy, B120VCA titanium alloy, Beta 111 titanium alloy.

In the embodiment of FIG. 3 the composite fastener of the invention is held in place by the interference fits between the mandrel 12 and the sleeve 10, and between the sleeve 10 and the bores of the tapered holes in the structural members 14 and 16. No reliance is placed upon a butt-shaped head on the sleeve 10, as in the previous embodiment, to hold the mandrel in place. The taper angle in the embodiment of FIG. 3 should not exceed 7°. It will be noted also in the embodiment of FIG. 3 that the mandrel is actually driven into the head end of the sleeve, from the opposite side to the side shown in FIGS. 1 and 2.

In the embodiment of FIG. 4 the hole in the plates 14 and 16 is not tapered, and the sleeve 10 also has an outer cylindrical surface, as mentioned above, so as to fit into the hole. In the latter embodiment the only taper is between the mandrel 12 and the inner bore of the sleeve 10.

As mentioned above, the sleeve 10 should be composed of a relatively soft material. Moreover, it should be as thin walled as possible for two reasons. The first reason is that the mandrel may be made of a harder material, as mentioned above, since it does not have to expand and the shear capabilities of the composite fastener will be a function of the combination. Therefore, as also noted, it is desirable to have a maximum amount of the harder higher strength material. The second reason for the thin wall sleeve is to reduce the amount of work required in installing the mandrel, and to maximize the amount of sleeve material flow available to adjust the tolerance variations. The minimum wall thickness of the sleeve is a function of the required interference and tension capabilities of the fastener.

As mentioned above, and as shown schematically in FIG. 5, it is desirable for the mandrel to be pre-inserted into the sleeve at the factory in an interference press fit. When such a technique is used, each unit supplied to the ultimate user constitutes a matched pair insofar as the mandrel and sleeve is concerned, and there is no need for the user to spend time and effort in attempting to match up mandrels with associated sleeves. Also, since the preassemblage of the mandrel and sleeve eliminates mandrel/sleeve tolerances, each unit supplied to the ultimate user has predictable expansion characteristics for desired interference fits with the joined structure between the minimum and maximum allowable tolerances. The tolerance range is established by plotting fatigue performance against interference. A sharp optimum peak is obtained in the curve between the tolerance limits, and the fatigue performance drops off sharply if the interference is either decreased or increased on either side of the optimum. In this way the permissible interference tolerance range is derived for a particular permissible range of fatigue performance. In the prior art fasteners, however, as the interference is increased above the lower end of the tolerance range, limits in fatigue resistance were encountered due to galling. The fastener of the invention, on the other hand, permits the interference to be increased to a particular optimum, and with up to 10 times improvement in fatigue resistance, as compared with the prior art fasteners.

As shown in the steps of FIG. 5, for example, the mandrel 12 of FIG. 5A is inserted into the sleeve 10 of FIG. 5B at the factory in an interference press fit, so as to provide the resulting composite fastener shown in FIG. 5C. The sleeve 10 is then finished by a grinding operation to the desired ultimate external diameter with the mandrel in place, and the unit is then supplied to the ultimate user. If the sleeve 10 is to be of the bolt type, the threads are rolled onto the right hand end in FIG. 5C, for example, after the mandrel has been pre-inserted in accordance with the technique referred to above, so that they too may have predictable dimensions within close tolerances.

In the factory pre-installation process of FIGS. 5A, 5B and 5C, the mandrel 12 is installed at a precise location within the sleeve 10, and it is retained by the self-locking characteristics of the taper and the resilient spring-back of the sleeve material. This essentially eliminates the radial tolerance influence of the mandrel-to-sleeve interface, as mentioned above, and it also simplifies the logistics problems.

The fatigue resistance improvement in the jointed structural material is a function within certain limits of the residual tension stress which is introduced into the structural material by the fastener, as mentioned above. This residual tension stress is a function of the modulus of elasticity in tension of the material of the joined structural members and the radial deformation induced by the fastener. Variations in the amount of radial deformation and associated residual stress are a function of the total accumulated tolerances of the fastener and the hole. For example, in a typical composite fastener, the required grinding total tolerance range for the outside diameter of the fastener of FIG. 5B may be 0.005 inches, that is, ±0.0025 inches. Plating tolerance range may be the same and is additive on the diameter which provides ±0.0005 inches if ground and plated. An additional ±0.0005 inches should be provided in diameter for effect of variation in the mandrel placement when inserted into the position shown in FIG. 5C. Therefore, if the hole preparation tolerances are held to +0.003—0 inches, the radial expansion of the diameter of the hole in the joined material will be within ±0.00175 of a predetermined value if the fastener is unplated, or within ±0.002 of a predetermined value if the fastener is plated. These parameters are well within present-day tolerance requirements.

The fastener of FIG. 5C is then supplied to the user, and is inserted into the holes in the plates 14 and 16 as shown in FIG. 6A. A usual back-up ring 50 is then placed against the right hand end of the sleeve 10. A spring-loaded locating pin 52 is included in the back-up ring in most presentday installations. Then, the composite fastener is installed by clamping the left hand end of the mandrel 12 and the back-up ring 50 together, so that the mandrel is driven to the right in FIG. 6A and the right hand end of the sleeve 10 is turned over into a butt joint, as shown in FIG. 6B. Also the shape of the right hand end of the mandrel 12 in FIG. 6, as shown, is such the mandrel locks the sleeve and itself together within the holes in the plates 14 and 16 (FIG. 6B).

In the embodiment of FIGS. 5 and 6, the mandrel is tapered through the entire grip length. Also, the outside diameter of the sleeve in the embodiment of FIGS. 5 and 6 is finish ground to a cylindrical shape. In a typical pin installation in an aluminum structure, the hole tolerance in the joined plates 14 and 16 may be of +0.003—0 inches from nominal diameter. The outer surface of the sleeve 10 of the assembly of FIG. 5C is then ground to be 0.005—0.001 inches smaller than the nominal diameter of the hole, or ground and plated to be 0.0005—0.0015 smaller than the nominal diameter. The mandrel protrusion on the manufactured head end in FIG. 5C is located to provide, for example, +0.007 +.009 of radial expansion on the diameter of a 5/16th inch diameter fastener, all fastener tolerances considered. Therefore, final placement of the mandrel with all the tolerances considered will cause the hole diameter in the structural material into which a plated pin has been installed to have been expanded from +0.0035 to +0.0085 inches.

The fastener driving procedure of FIG. 6 is quite similar to the driving of conventional rivets, for example, in a typical aircraft structure. First the plates 14 and 16 being joined must be reasonably close to one another. If these materials are relatively heavy, there should be a nominal clamp-up force applied for holding them together. A conventional flush rivet gun set or squeeze gun die is applied to the head end of the mandrel. The back-up ring 50 and spring loaded indexing pin 52 are then applied to the protruding portion of the sleeve as shown in FIG. 6A, with the index pin inserted into the cylindrical reset in the end of the sleeve, as illustrated. Squeeze force or successive impact force is then applied to the fastener so that the mandrel 12 is driven into the sleeve, and so that the end of the sleeve is upset to a butt joint as shown in FIG. 6B.

The invention provides, therefore, an improved composite fastener which is relatively inexpensive and easy to install. The composite fastener of the invention has the feature in that it may be installed into the members to be joined thereby to provide an interference fit between the fastener and the material of the joined members without galling or burnishing the bores of the hole in which the fastener is inserted, and which thereby reduces notch effects and material fatigue failures to a minimum.

What is claimed is:

1. A method for securing together a plurality of structural members having a hole extending therethrough, said method comprising the steps of:

inserting a sleeve-like member of relatively soft material having a head at one end thereof into said hole until the head engages one of said structural members at the edge of said hole;

inserting a tapered mandrel member composed of relatively hard material through said sleeve member to cause said sleeve member to flare radially outwardly against the bore surface of said hole into an interference fit with said structural members and to exert a substantially uniform radial outward force on said bore surface so as to produce a substantially uniform predetermined tensile load in the material around said hole in said structural members; and upsetting the end of said sleeve remote from said head to provide a butt-shaped configuration engaging the edge of said hole at the opposite end thereof from said head.

2. The method defined in claim 1, and which includes selecting the material of the sleeve-like member to be compatible with the material of the structural members so as to minimize galvanic action between the sleeve-like member and the structural members.

* * * * *